United States Patent
Cheng et al.

(10) Patent No.: US 9,237,334 B2
(45) Date of Patent: Jan. 12, 2016

(54) METHOD AND DEVICE FOR CONTROLLING SUBTITLE APPLIED TO DISPLAY APPARATUS

(71) Applicant: MStar Semiconductor, Inc., Hsinchu Hsien (TW)

(72) Inventors: Kun-Nan Cheng, Hsinchu County (TW); Chung-Yi Chen, Nantou County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 332 days.

(21) Appl. No.: 13/888,455

(22) Filed: May 7, 2013

(65) Prior Publication Data

US 2013/0307945 A1    Nov. 21, 2013

(30) Foreign Application Priority Data

May 17, 2012   (TW) .............................. 101117642 A

(51) Int. Cl.
   *H04N 13/04* (2006.01)
   *H04N 13/00* (2006.01)
(52) U.S. Cl.
   CPC ............. *H04N 13/04* (2013.01); *H04N 13/007* (2013.01)
(58) Field of Classification Search
   CPC ....................................................... H04N 13/04
   USPC ........................................ 348/51, 53–56, 468
   See application file for complete search history.

(56) References Cited

U.S. PATENT DOCUMENTS

| | | | |
|---|---|---|---|
| 2010/0021141 A1* | 1/2010 | Yamashita et al. | 386/109 |
| 2010/0150523 A1* | 6/2010 | Okubo et al. | 386/68 |
| 2011/0102559 A1* | 5/2011 | Nakane | 348/54 |
| 2011/0228057 A1* | 9/2011 | Kobayashi | 348/51 |
| 2012/0182402 A1* | 7/2012 | Hwangbo et al. | 348/51 |
| 2012/0320155 A1* | 12/2012 | Suh et al. | 348/43 |
| 2013/0169765 A1* | 7/2013 | Park et al. | 348/54 |

FOREIGN PATENT DOCUMENTS

| | | |
|---|---|---|
| CN | 102202224 | 9/2011 |
| WO | 2011087470 | 7/2011 |

OTHER PUBLICATIONS

Taiwan Intellectual Property Office, "Office Action," Jun. 22, 2015.

* cited by examiner

*Primary Examiner* — Paulos M Natnael
(74) *Attorney, Agent, or Firm* — WPAT, PC; Justin King

(57) ABSTRACT

A method for controlling subtitles applied to a display apparatus is provided. The method is capable of dynamically adjusting a subtitle of an original image. The original image includes a right-eye frame and a left-eye frame. The right-eye frame includes right-eye subtitle information, and the left-eye frame includes left-eye subtitle information. The method includes the steps of: determining an adjusted subtitle display mode; determining a shift distance of the right-eye subtitle information and the left-eye subtitle information; and adjusting the shift distance according to the adjusted subtitle display mode or a given 3D depth, such that an adjusted subtitle presented by the right-eye frame and the left-eye frame shows an adjusted subtitle 3D depth. The adjusted subtitle display mode includes a static display mode and a dynamic 3D display mode.

6 Claims, 12 Drawing Sheets

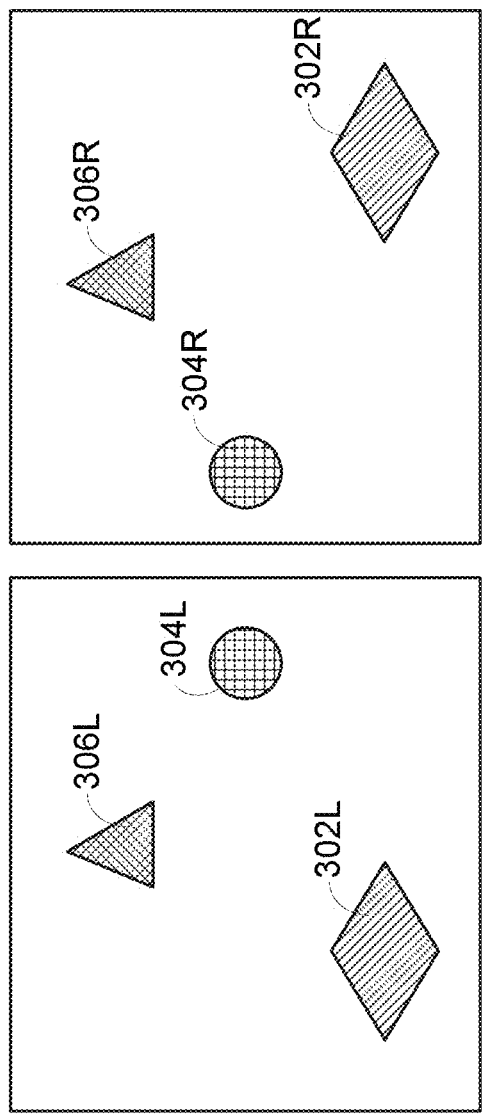
FIG. 2A
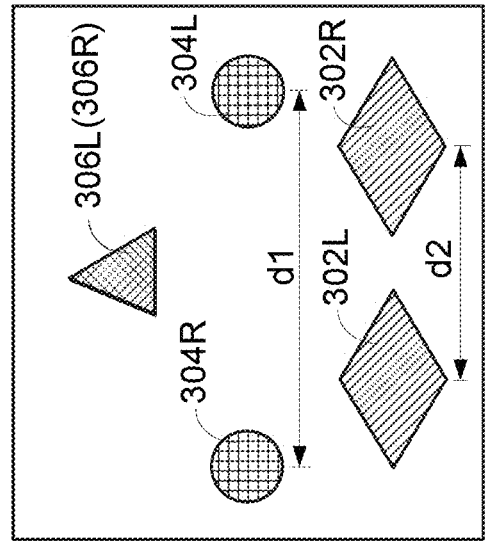
FIG. 2B
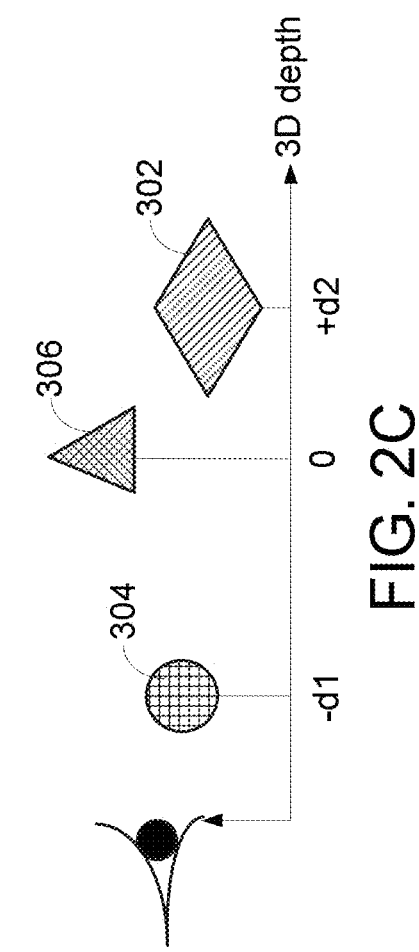
FIG. 2D
FIG. 2C

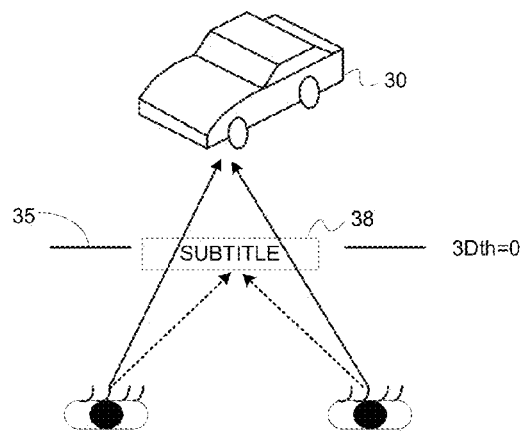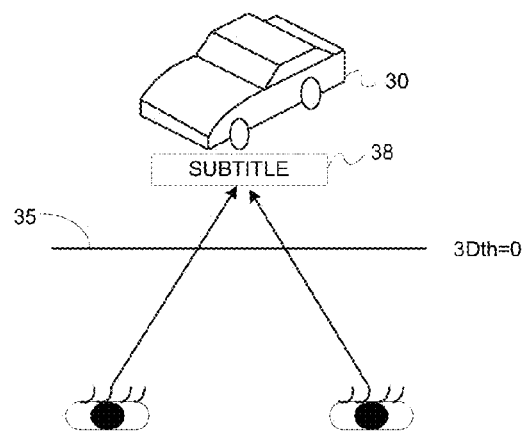
FIG. 4A
FIG. 4B

METHOD AND DEVICE FOR CONTROLLING SUBTITLE APPLIED TO DISPLAY APPARATUS

This application claims the benefit of Taiwan application Serial No. 101117642, filed May 17, 2012, the subject matter of which is incorporated herein by reference.

BACKGROUND OF THE INVENTION

1. Field of the Invention

The invention relates in general to a control method and device for an image signal, and more particularly, to a method and device for controlling a subtitle applied to a display apparatus.

2. Description of the Related Art

With the spur of three-dimensional (3D) movies, related products such as 3D televisions have also begun to prosper. After receiving an image signal generated by a 3D image source (e.g., a player supporting 3D images), the 3D television displays the 3D image according to the image signal, offering a viewer the pleasure of viewing a 3D movie.

In general, after receiving an image signal, a 3D television alternately displays a left-eye frame and a right-eye frame on a screen and correspondingly shields a left eye and a right eye of a viewer in an alternate manner. Alternatively, the left-eye frame and the right-eye frame are played in a row interlaced format, and a micro polarizer is utilized by a viewer to allow a left eye of the viewer to perceive the left-eye frame and a right eye of the viewer to perceive the right-eye frame. Due to minute differences between objects in the left-eye and right-eye frames, the viewer is then enabled to observe a 3D movie with increased visual depth perception.

While filming image signals, a same object is filmed by two video cameras located at different positions. A first video camera captures a left-eye frame, and a second video camera captures a right-eye frame. In a post-process of the image signals, in addition to processing the left-eye and right-eye frames by the foregoing temporally alternating and row interlacing approaches, a subtitle can be selectively added to the left-eye and right-eye frames to further interpret dialog content of the images. Once the image signals are post-processed, a 3D image source transmits the image signals to a 3D television, which then plays a corresponding 3D movie according to the image signals.

In some image signals outputted by a 3D source, a subtitle is already added to a predetermined position in the left-eye and right-eye frames. However, in conventional 3D television processing mechanisms, the position and image properties of the subtitle in the left-eye and right-eye frames are inalterable. For example, a 2D subtitle cannot be changed to a 3D subtitle.

In other words, when image signals outputted from a 3D image source are already attached with a subtitle, a current 3D television merely serves as a receiver of the image signals, incapable of changing the position and image properties of the subtitle. In this way, a viewer may not timely adapt to a display mode of a subtitle when viewing a 3D movie under certain circumstances, and thus suffer from extreme eye discomfort and fatigue.

SUMMARY OF THE INVENTION

The invention is directed to a method and device for controlling a subtitle applied to a display apparatus. When the display apparatus receives an original image signal outputted by an image source, a subtitle in a left-eye frame and a right-eye frame may be captured and a 3D depth of the subtitle is changed, such that the subtitle can be presented in a 3D or 2D display mode to a viewer.

A subtitle control method applicable to a display apparatus for dynamically adjusting a subtitle of an original image is provided by the present invention. The original image includes a right-eye frame and a left-eye frame. The right-eye frame contains right-eye subtitle information, and the left-eye frame contains left-eye subtitle information. The subtitle control method includes step of: selecting an adjusted subtitle display mode; determining a shift distance of the right-eye subtitle information and the left-eye subtitle information; and selectively adjusting the shift distance according to the adjusted subtitle display mode and a 3D depth, such that an adjusted subtitle presented by the right-eye frame and the left-eye frame shows an adjusted subtitle 3D depth. The adjusted subtitle display mode includes a static display mode and a dynamic 3D display mode.

A subtitle control method applicable to a display apparatus for dynamically adjusting a subtitle of an original image is further provided by the present invention. The original image includes a right-eye frame and a left-eye frame. The right-eye frame contains right-eye subtitle information, and the left-eye frame contains left-eye subtitle information. The subtitle control method includes the step of: determining an original subtitle display mode according to a shift distance of the right-eye subtitle information and the left-eye subtitle information; determining whether to change the original subtitle display mode; and selectively generating a 3D depth and accordingly adjusting the shift distance, such that an adjusted subtitle presented by the right-eye frame and the left-eye frame shows an adjusted subtitle 3D depth. The adjusted subtitle display mode includes a static display mode and a dynamic 3D display mode.

A subtitle control device applicable to a display apparatus is configured to dynamically adjust a subtitle of an original image is further provided by the present invention. The original image includes a right-eye frame and a left-eye frame. The right-eye frame contains right-eye subtitle information, and the left-eye frame contains left-eye subtitle information. The subtitle control device includes: a subtitle capturing unit, configured to capture the left-eye subtitle information from the left-eye frame and the right-eye subtitle information from the right-eye frame, and determine an original subtitle display mode according to a shift distance of the right-eye subtitle information and the left-eye subtitle information; a frame processing unit, configured to generate a 3D depth; and a subtitle superimposing unit, configured to selectively generate an adjusted left-eye frame and an adjusted right-eye frame according to the 3D depth. An adjusted subtitle presented by the adjusted right-eye frame and the adjusted left-eye frame shows an adjusted subtitle 3D depth.

A subtitle control method applicable to a display apparatus for converting a 2D image having a single frame to a 3D image having a right-eye frame and a left-eye frame is further provided by the present invention. The subtitle control method includes steps of: capturing a subtitle in the single frame; selectively superimposing the subtitle in the right-eye frame and the left-eye frame, such that such that an adjusted subtitle presented by the right-eye frame and the left-eye frame shows an adjusted subtitle 3D depth. The adjusted subtitle presented by the adjusted right-eye frame and the adjusted left-eye frame has an adjusted subtitle 3D depth.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIGS. 2A, 2B, 2C, and 2D illustrate methods for determining a distance of an object according to difference images simultaneously perceived by the both eyes.

FIGS. 4A and 4B are display modes of a subtitle in a 3D television.

DETAILED DESCRIPTION OF THE INVENTION

When a 3D television presents an object, due to differences between a left-eye frame and a right-eye frame, a brain of a viewer establishes a 3D object according to the images perceived by both eyes. Principles of the above are described below.

A human brain establishes a 3D visual effect according to images perceived by left and right eyes. Certain differences exist between images presented to the left and right eyes when an object is perceived by the left and right eyes, and a human brain then establishes a 3D image according to the images perceived by the both eyes.

Figure 1A:
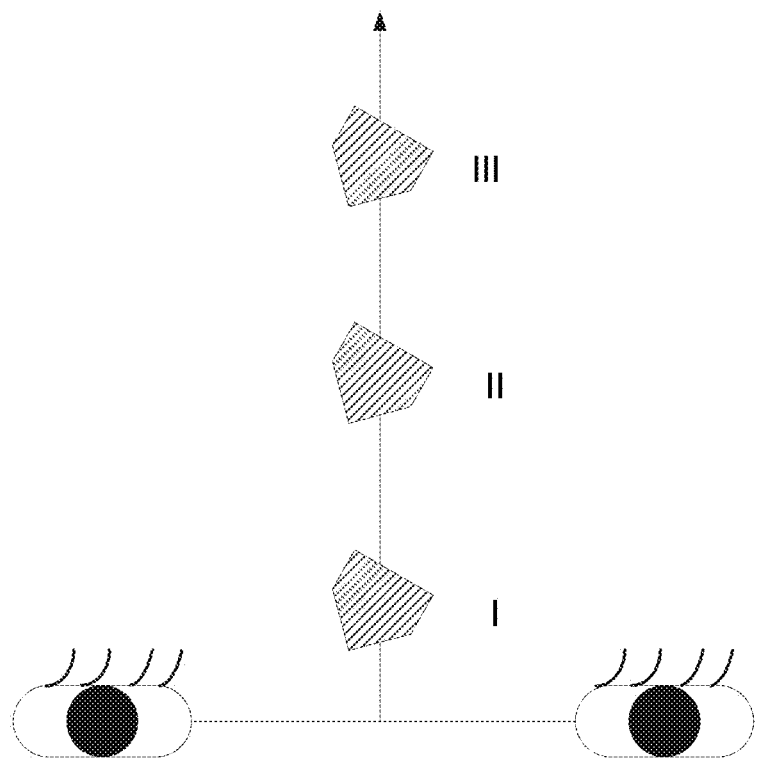
FIGS. 1A and 1B are schematic diagrams of image formation from respective eyes when an object is perceived by the both eyes.
Figure 1B:
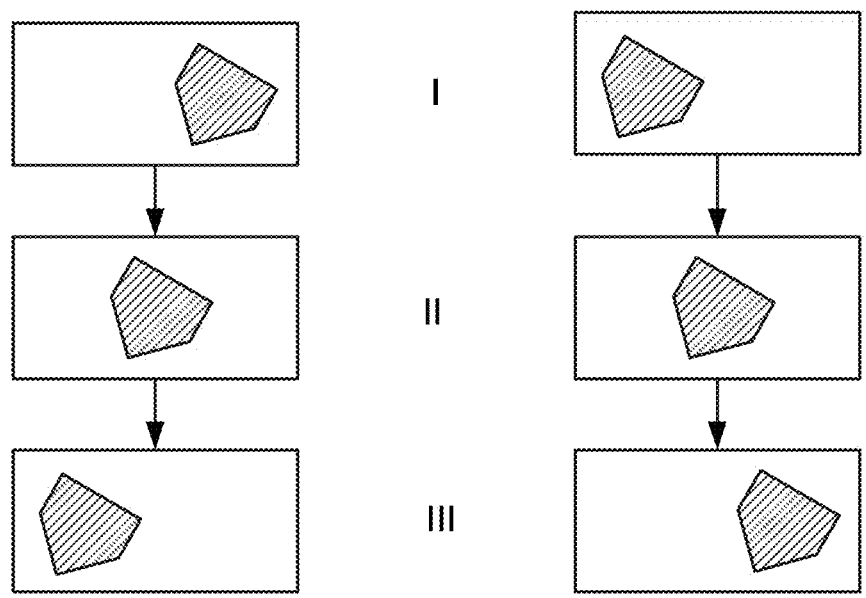

FIGS. 1A and 1B show schematic diagrams of image formation of respective eyes when an object is perceived by the both eyes. When an object is closely located at a position "I" right in front of the eyes, the object perceived by the left eye is located at the right half of the left-eye frame, and the object perceived by the right eye is located at the left half of the right-eye frame. As the object continues to move away from the eyes, the object perceived by the left and right eyes gradually moves towards the center of the frame perceived by each eye. When the object is at a position "II", the images perceived by the left eye become identical, i.e., the object is at the center of the image frame perceived by each eye. At this point, a distance between the position "II" and the eyes may be considered as a reference distance. As the object again continues to move away from the eyes, the object perceived by the left eye is at the left half of the left-eye frame, and the object perceived by the right eye is at the right half of the right-eye frame.

Based on the abovementioned facts, a concept of 3D depth is developed. FIGS. 2A, 2B, 2C, and 2D illustrate a method for determining a position of an object by utilizing images simultaneously perceived by both eyes. The descriptions below are given with respect to the horizontal direction.

Assume that a left-eye frame perceived by the left eye is as shown in FIG. 2A, with a rhombus 302L at the left of the image, a circle 304L at the right of the image, and a triangle 306L positioned horizontally between the rhombus 302L and the circle 304L. Also assume a right-eye frame perceived by the right eye is as shown in FIG. 2B, with a rhombus 302R at the right of the image, a circle 304R at the left of the image, and a triangle 306R positioned horizontally between the rhombus 302R and the circle 304R. Accordingly, distances from the three objects to the eyes are shown in FIG. 2C; that is, a circle 304 perceived by the both eyes is closest to the eyes, a triangle 306 is at a reference position, and a rhombus 302 is farthest from the eyes. In other words, the distance between a particular object and the eyes can be obtained according to relative positions of the same object in the left-eye frame and the right-eye frame.

With reference to FIG. 2D, assuming that the left-eye frame in FIG. 2A is defined as a reference frame, a horizontal distance resulted from the visual difference/a visual range between the same object in the two images shown in FIGS. 2B and 2A is referred to as a 3D depth of the object. It is apparent that, the triangle 306 has a 3D depth of 0 since the triangle 306L and the triangle 306R are located at the reference position. That is, in the visual ranges of the left and right eyes, the horizontal positions of the triangle 306 are the same. Similarly, the circle 304L in the left-eye frame is at the right and the circle 304R is in the right-eye frame is at the left, and so the circle 304 has a 3D depth of negative d1. Similarly, the rhombus 302L in the left-eye frame is at the left and the rhombus 302R in the right-eye frame is at the right, and so the rhombus 302 has a 3D depth of positive d2.

A 3D depth may also be defined as a positive value through coordinate shifting. In other words, a 3D depth of an object becomes smaller as the object gets closer to the eyes, and becomes larger as the object moves farther away from the eyes. In the following examples, a reference position has a 3D depth of 0, a position closer to the eyes has a 3D depth in a smaller negative value, and a position farther away from the eyes has a 3D depth of a greater positive value.

Figure 3A:
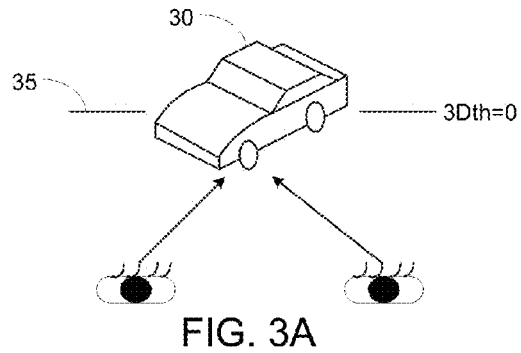
FIGS. 3A, 3B, and 3C are for explaining a relationship between an object and the both eyes by controlling a 3D depth.

Referring to FIG. 3A, when a 3D television displays an object 30 having a 3D depth of 0 (3Dth=0), both eyes of a viewer perceive identical frames, and the object 30 is displayed on a screen plane 35. In other words, the screen plane 35 of the 3D television may be considered as a reference position. At this point, both eyes of the viewer are focused on the object 30, i.e., on the screen plane 35.

Figure 3B:
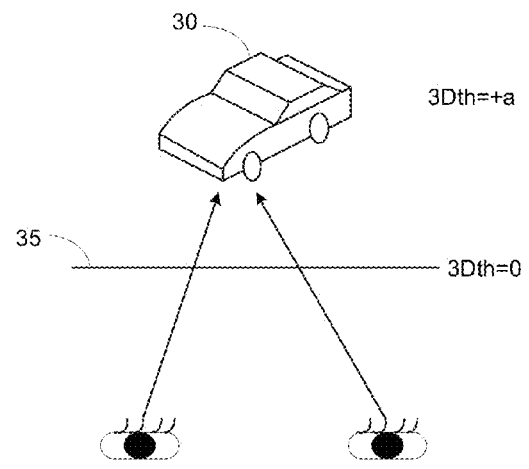

Referring to FIG. 3B, when the 3D television displays the object 30 having a 3D depth of a positive value (3Dth=+a), the object 30 perceived by the viewer appears to be behind the screen plane 35. As the value of a gets larger, the viewer feels that the object 30 gets farther and farther away behind the screen plane 35.

Figure 3C:
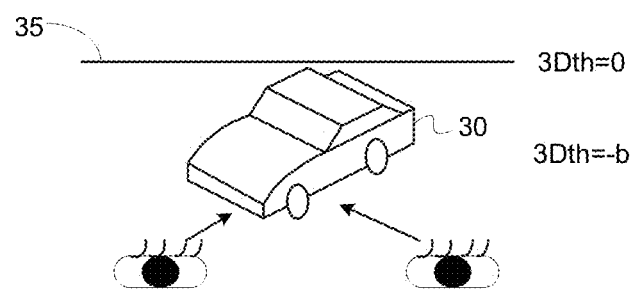

Referring to FIG. 3C, when the 3D television displays the object 30 having a 3D depth of a negative value (3Dth=−b), the object 30 perceived by the viewer appears to be in front the screen plane 35. At this point, both eyes of the viewer are focused in front of the screen plane 35. As the value of b gets larger, the viewer feels that the object 30 gets closer and closer to the viewer.

It can be seen from the above descriptions that, by controlling the left-eye frame and the right-eye frame through the concept of 3D depth, the distance of the object 30 presented at, in front of or behind the screen 35 can be arbitrary decided. That is to say, by controlling a horizontal shift distance (3D depth) of the object 30 in the left-eye frame and the right-eye frame, the distance between the object 30 and the viewer can be determined.

In general, a subtitle is already attached to the left-eye frame and the right-eye frame when image signals of a 3D movie are outputted from an image source (e.g., a player) to a 3D television, such that the 3D television has no control over a position of the subtitle. The subtitle position is displayed as in the following two modes in images signals generated by an image source.

Referring to FIG. 4A, when positions of a subtitle 38 in the left-eye frame and the right-eye frame are the same, the subtitle 38 perceived by the viewer is located on the screen plane 35. That is, the subtitle 38 has a 3D depth of 0 (3Dth=0), and is displayed in a 2D mode.

It should be noted that, when a 3D television plays a 3D movie, the distance between the object 30 and the eyes is also constantly changing due to the constantly changing 3D depth of the object 30. In the above situation, both eyes of the viewer need to persistently and adaptively focus on the object 30 and the subtitle 38 during the process of viewing the 3D movie, and so eye discomfort and fatigue are likely to be aroused after viewing the 3D movie for a period of time.

Alternatively, referring to FIG. 4B, when an image source outputs image signals, the 3D depth of the subtitle 38 varies along with the 3D depth change of the object 30. At this point, both eyes of the viewer can be simultaneously focused on the object 30 and the subtitle 38. However, such display mode of the subtitle 38 is still not ideal for all viewers.

According to one embodiment of the present invention, when image signals outputted by an image source (e.g., a player) are received by a display apparatus (e.g., a 3D television), the display apparatus analyzes positions of the subtitle in the left-eye frame and the right-eye frame, and determines a 3D depth of the subtitle. A subtitle capturing unit in the display apparatus captures the subtitle from the left-eye frame and the right-eye frame, and a viewer is given an option to whether to present the subtitle in a 3D display mode or a static display mode (e.g., presenting the subtitle on a screen plane in a 2D display mode).

When the viewer wishes to present the subtitle in a 2D display mode, the display apparatus superimposes the subtitle in the left-eye frame and the right-eye frame, and determines a fixed shift distance for the subtitle (e.g., maintaining the 3D depth of the subtitle at zero). Thus, the subtitle can be presented in a 2D display mode on the screen plane 35 of the 3D television. That is to say, the 2D display mode may be regarded as a predetermined static display mode. Alternatively, the display apparatus may also fix the 3D depth of the superimposed subtitle to another value to present the superimposed subtitle at a predetermined focal position rather than fixing to the screen plane 35 of the 3D television. Such an approach of presenting the subtitle is also a static display mode.

In contrast, to present the subtitle in a dynamic 3D display mode, the display apparatus superimposes the subtitle at different positions in the left-eye frame and the right-eye frame, such that the 3D depth of the subtitle also varies along with the 3D depth change of a predetermined object. Thus, the subtitle having a constantly changing 3D depth is then presented in a 3D display mode.

Moreover, when the display apparatus determines that the 3D depth of the subtitle is maintained at a fixed value (when the subtitle is presented in a static display mode), the display apparatus may also be set to change the 3D depth of the subtitle so that the subtitle is presented in a dynamic 3D display mode.

Figure 5:
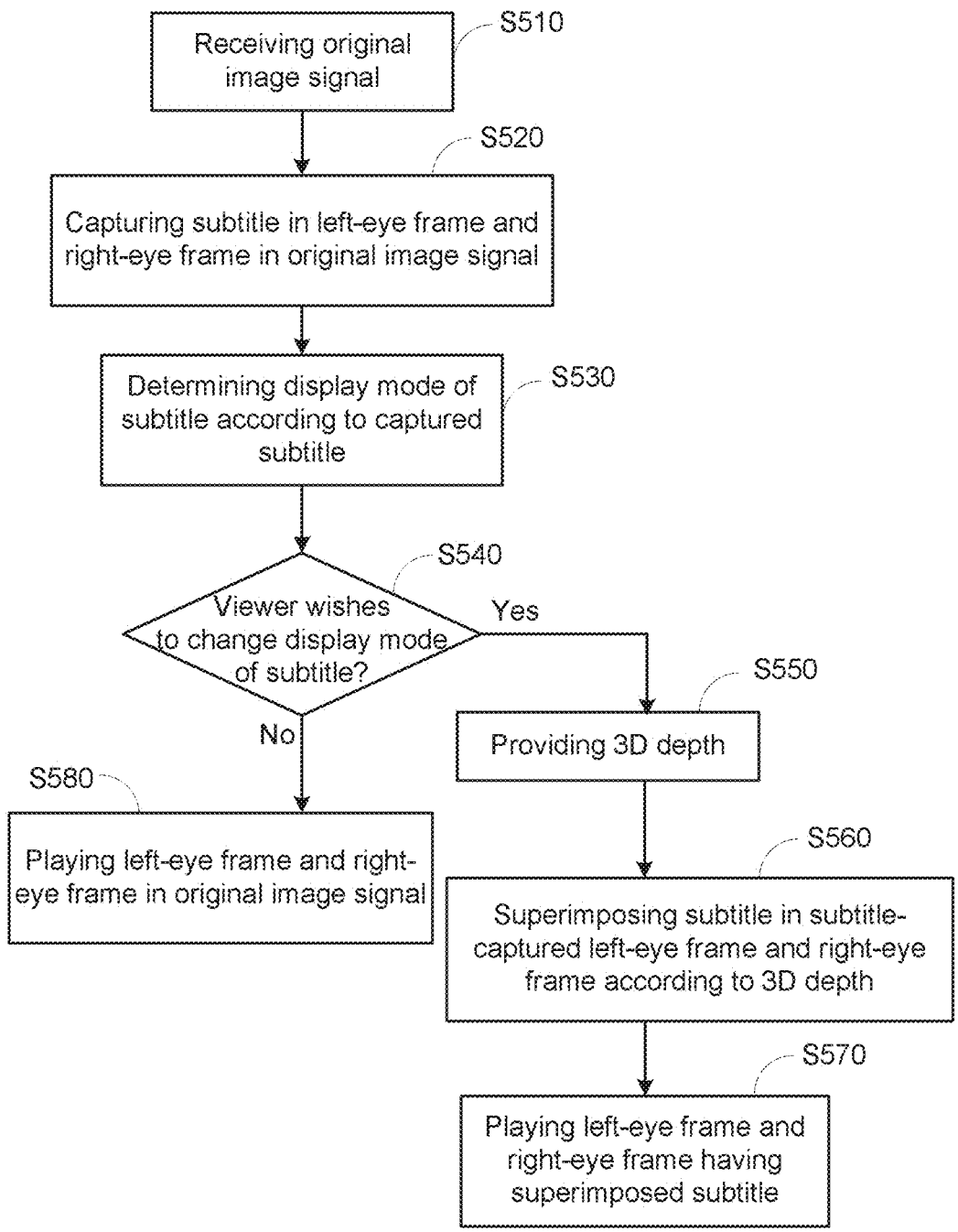
FIG. 5 is a subtitle control method applied to a display apparatus according to one embodiment of the present invention.

FIG. 5 shows a subtitle control method applied to a display apparatus according to one embodiment of the present invention. As the display apparatus starts to receive an original image signal outputted by an image source in Step S510, the display apparatus first captures a subtitle in a left-eye frame and a right-eye frame in the original image signal in Step S520. After capturing the subtitle, subtitle-captured left-eye frame and right-eye frame (e.g., left-eye and right-eye frames without the subtitle) are generated. In Step S530, the display apparatus determines a display mode of the subtitle.

When a viewer accepts the current display mode (i.e., the current mode is acceptable instead of having to change the current mode) for displaying the subtitle in Step S540, the display apparatus directly plays the left-eye frame and the right-eye frame in the original image signal in Step S580 for the viewer.

Conversely, when the viewer wishes to change the display mode of the subtitle, the display apparatus is set to change the display mode of the subtitle in Step 540. The display apparatus first sets a 3D depth in Step S550, and superimposes the subtitle in the left-eye frame and the right-eye frame in Step S560. In Step S570, the left-eye frame and the right-eye frame with the superimposed subtitle are played for the viewer.

In another embodiment, Step S540 of determining whether to change the display mode of the subtitle may also be performed between Steps S510 and S520, so that the process can be simplified by eliminating Step S520 if the current display mode of the subtitle is acceptable to the viewer.

FIG. 5 is a detailed process applied to a display apparatus for dynamically adjusting a subtitle of an original image according to one embodiment of the present invention. According to the above descriptions, a user is first given an option to select an adjusted subtitle display mode. A shift distance is then determined according to the right-eye subtitle information obtained in the right-eye frame and the left-eye subtitle information obtained in the left-eye frame. Next, the shift distance is adjusted according to the adjusted subtitle display mode and a 3D depth, such that the adjusted subtitle presented by the right-eye frame and the left-eye frame shows the adjusted subtitle 3D depth. The adjusted subtitle display mode includes a static display mode and a dynamic 3D display mode. It can be seen from the above descriptions that, the display apparatus needs to first capture the subtitle from the left-eye frame and the right-eye frame after the display apparatus receives the original image signal outputted by the image source.

Conventionally, to facilitate identification of the subtitle, the subtitle is usually fixed at a predetermined position in a frame, e.g., a lower middle part of the frame. In addition, the color and brightness of the subtitle are frequently more distinct from other images in the frame so that the subtitle can be more easily identified by the viewer. Alternatively, the subtitle has a text background or the subtitle is located at an outer frame of the background. The display apparatus of the present invention captures the subtitle in the image according to the above properties of the subtitle.

Figure 6A:
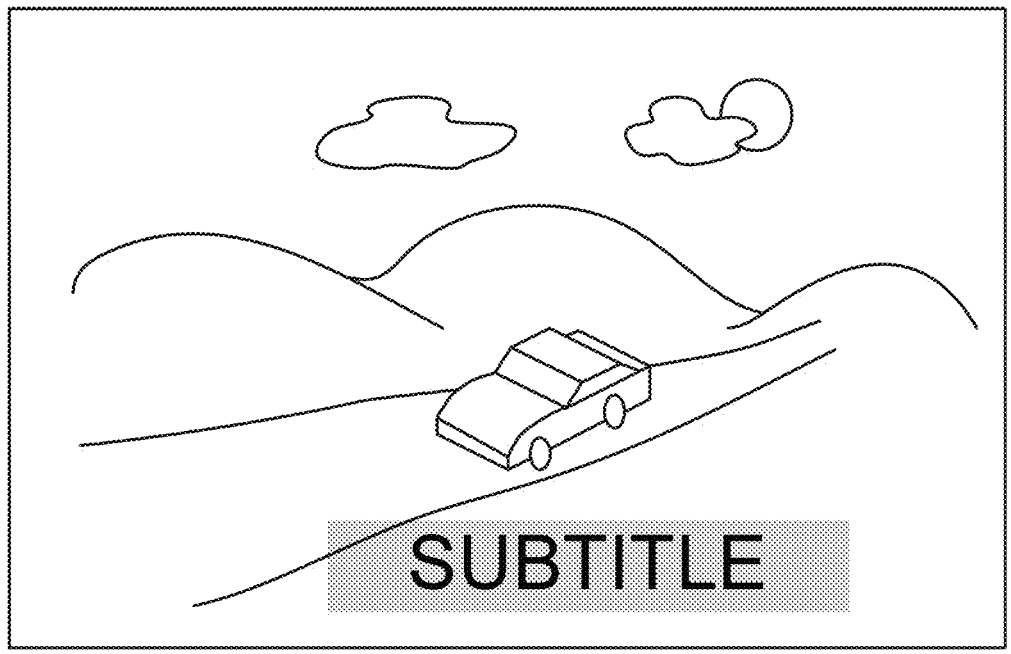
FIGS. 6A, 6B, and 6C are schematic diagrams of various subtitles in an image.
Figure 6B:
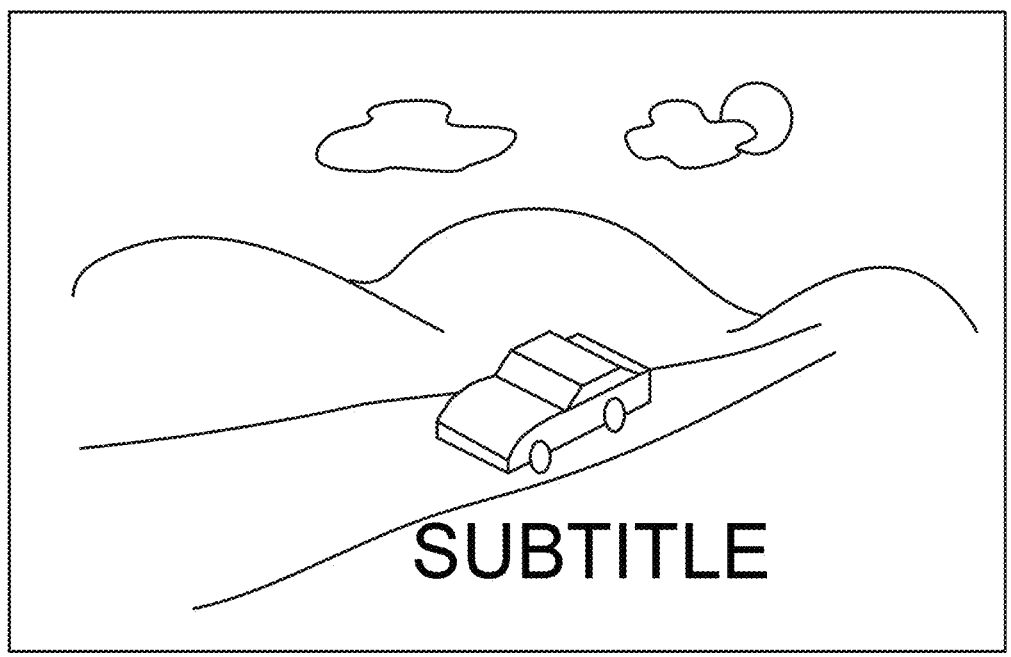
Figure 6C:
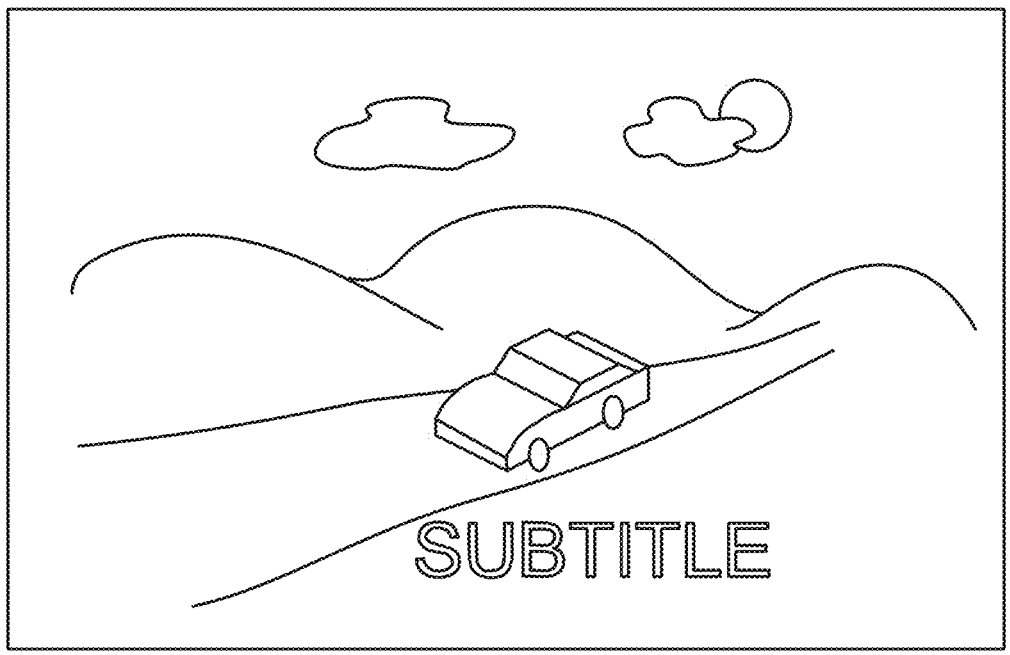

FIGS. 6A, 6B, and 6C show schematic diagrams of various subtitles in a frame, which may be a left-eye frame or a right-eye frame. As shown in FIG. 6A, the subtitle in the frame has a background frame, within which the subtitle is located. The display apparatus can easily capture the entire background frame and the subtitle according to the high-contrast color of the background frame.

Referring to FIG. 6B, the subtitle in the frame is in a solid text, and has a color and brightness that are highly contrasted from other images in the frame. The display apparatus may set a brightness threshold to capture the subtitle located at a lower middle part of the frame.

Referring to FIG. 6C, the subtitle in the frame is in a hollow text form, and similarly has a color and brightness that are highly contrasted from other images in the frame. The display apparatus may capture the subtitle located at a lower middle part of the frame using an approach similar to the above.

After capturing the subtitle from the left-eye frame and the right-eye frame, the display apparatus determines the shift distance between the subtitle positions in the left-eye frame and the right-eye frame. Through continuous changes in the shift distance, the changes in the 3D depth can be obtained to further confirm the display mode of the subtitle. For example, assuming that the subtitle positions in the left-eye frame and the right-eye frame remain unchanged, it means the 3D depth of the subtitle is a fixed value. At this point, the subtitle is in a static display mode (e.g., a 2D display mode). Alternatively, when the shift distance between the subtitle positions in the left-eye frame and the right-eye frame is constantly changing, it means the 3D depth of the subtitle also dynamically changes, i.e., the subtitle is in a 3D display mode.

Thus, details of the display apparatus capturing the subtitle and determining the display mode of the subtitle are as explained in the above descriptions.

When the subtitle is presented in a static (or 2D) display mode, the display apparatus confirms that the 3D depth of the subtitle is a fixed value (e.g., maintaining the 3D dept at d1 such that the subtitle is presented on the screen plane). To change the static subtitle display mode to a dynamic 3D subtitle display mode, the display apparatus needs to provide the changing 3D depth to the separate subtitles. According to the changing 3D depth, the display apparatus again superimposes the subtitle in the left-eye frame and the right-eye frame, and plays the left-eye frame and the right-eye frame with the superimposed subtitle. Conversely, when maintaining the static (or 2D) subtitle display mode is in demand, the left-eye frame and the right-eye frame in the original image signal are directly played.

When the subtitle is presented in a dynamic 3D display mode, the display apparatus confirms that a value of the 3D depth of the subtitle is a changing 3D depth. At this point, to change the dynamic 3D subtitle display mode to a static (2D) subtitle display mode, the display apparatus provides a fixed 3D depth (e.g., a 3D depth of equal to d1) to the separate subtitles. According to the fixed 3D depth, the display apparatus again superimposes the subtitle in the left-eye frame and the right-eye frame, and plays the left-eye frame and the right-eye frame having the superimposed subtitle. The current subtitle is then presented in a static display mode. Similarly, to continue viewing the 3D subtitle display mode, the left-eye frame and the right-eye frame in the original image signal are directly played.

It should be noted that, to prevent eyes of the viewer from experiencing fatigue caused by constantly changing the focal distance of the eyes, the display mode for the subtitle is automatically changed from a static display mode to a dynamic 3D display mode when the display apparatus detects that the subtitle is presented in a static display mode.

Figure 7:
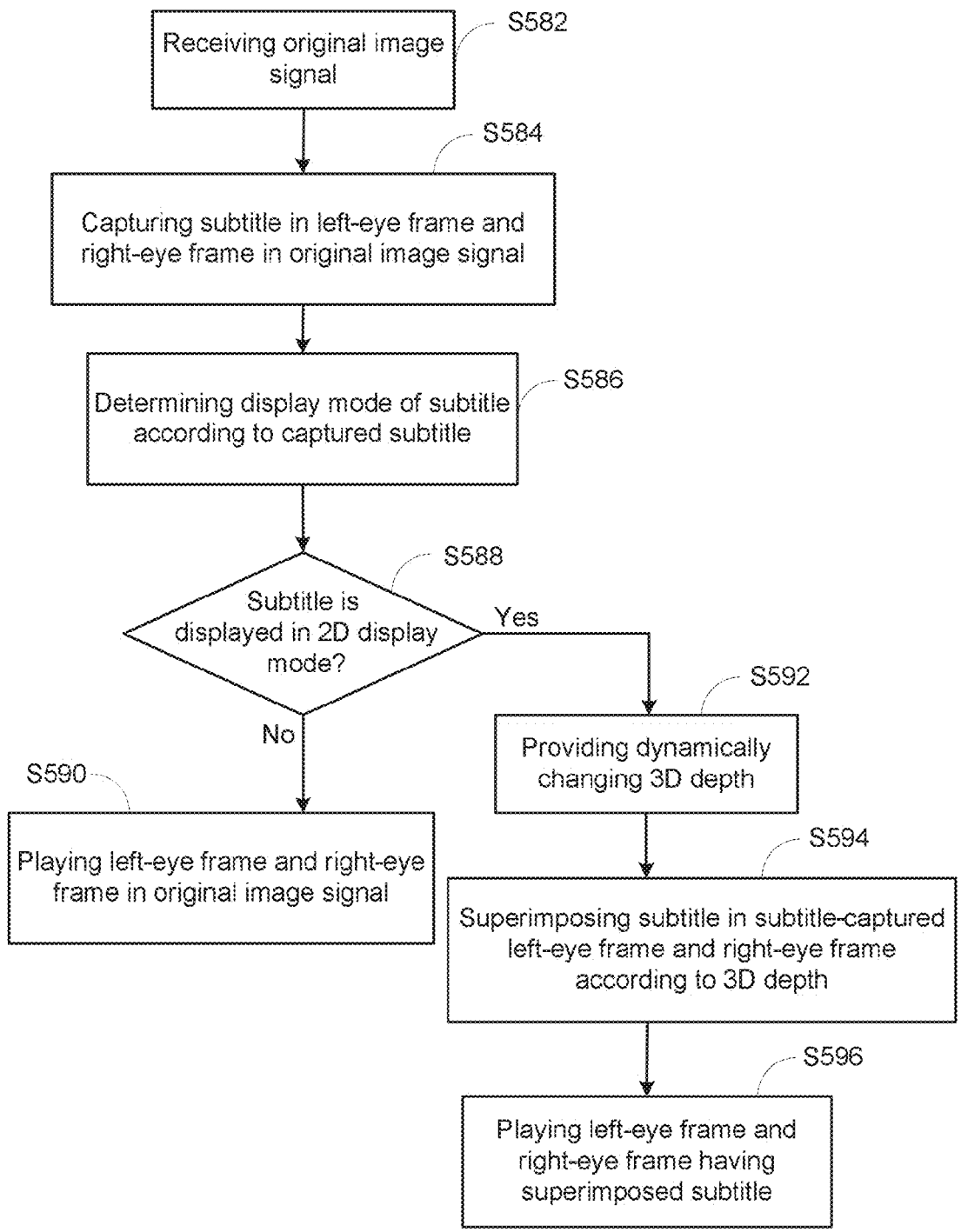
FIG. 7 is a subtitle control method applied to a display apparatus according to another embodiment of the present invention.

FIG. 7 shows a subtitle control method applied to a display apparatus according to another embodiment of the present invention. As the display apparatus starts to receive an original image signal outputted by an image source in Step S582, the display apparatus first captures a subtitle in a left-eye frame and a right-eye frame in the original image signal in Step S584. After capturing the subtitle, left-eye frame and right-eye frame without the subtitle are generated. In Step S586, the display apparatus determines a display mode of the subtitle.

When it is determined that the subtitle is not presented in a 2D display mode in Step S588, the display apparatus directly plays the left-eye frame and the right-eye frame in the original image signal in Step S590 for the viewer.

Conversely, when it is determined that the subtitle is presented in a 2D display mode in Step S588, the display apparatus provides a dynamically changing 3D depth in Step S592, and superimposes the subtitle in the left-eye frame and the right-eye frame according to the 3D depth in Step S594. In Step S596, the left-eye frame and the right-eye frame with the superimposed subtitle are played for the viewer.

In short, in this embodiment, the display apparatus automatically detects the subtitle and converts the subtitle to a 3D subtitle. Details for capturing and superimposing the subtitle in the second embodiment are as associated descriptions for the first embodiment, and shall be omitted herein.

FIG. 7 is a detailed process applied to a display apparatus for dynamically adjusting a subtitle of an original image according to one embodiment of the present invention. An original subtitle display mode is determined according to a shift distance of left-eye subtitle information and right-eye subtitle information. It is then determined whether to change the original subtitle display mode. Next, a 3D depth is selectively generated to adjust the shift distance, such that the adjusted subtitle presented by the right-eye frame and the left-eye frame shows an adjusted subtitle 3D depth. The original subtitle display mode includes a static display mode and a dynamic 3D display mode.

Figure 8:
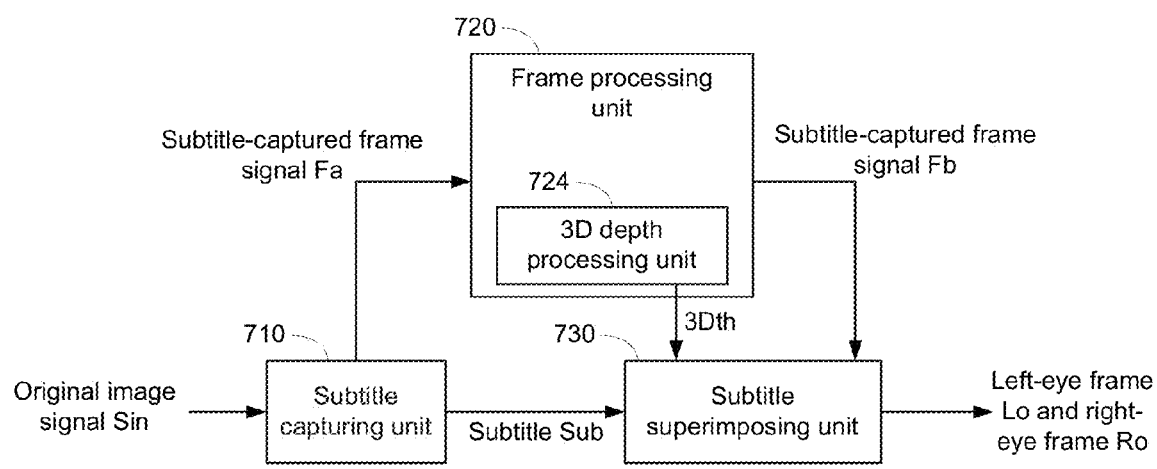
FIG. 8 is a subtitle control device applied to a display apparatus according to one embodiment of the present invention.

FIG. 8 shows a subtitle control device applied to a display apparatus according to one embodiment of the present invention. The subtitle control device only operates when a subtitle display mode is changed. Details of changing the display mode of the subtitle from a 3D display mode to a 2D display mode, and changing from a 2D display mode to a 3D display mode are described below. The subtitle control device includes a subtitle capturing unit 710, a frame processing unit 720, and a subtitle superimposing unit 730.

When the display apparatus is set, by a user or automatically, to change the subtitle display mode from 2D to dynamic 3D, the subtitle capturing unit 710 receives an externally inputted original image signal Sin and captures a subtitle Sub in a left-eye frame and a right-eye frame in the original image signal. The subtitle capturing unit 710 then outputs the captured subtitle Sub to the subtitle superimposing unit 730, and outputs a subtitle-captured frame signal Fa to the frame processing unit 720. The subtitle-captured frame signal Fa includes a subtitle-captured left-eye frame and a subtitle-captured right-eye frame without the subtitle.

After the frame processing unit 720 receives the subtitle-captured frame signal Fa, the 3D depth processing unit 724 analyzes a main object in the subtitle-captured frame, obtains a 3D depth 3Dth of the main object and outputs the 3D depth 3Dth to the subtitle superimposing unit 730. It is apparent that the 3D depth outputted to the subtitle superimposing unit 730 also changes as the 3D depth of the main object changes. The frame processing unit 720 selectively performs image processing on the subtitle-captured frame signal Fa to generate a subtitle-captured frame signal Fb. More specifically, the subtitle-captured frame signal Fb outputted by the frame processing unit 720 may be a same image as the subtitle-captured frame signal Fa received by the frame processing unit 720, or may be an image that is further processed. For example, assuming that a frame rate required by the display apparatus is higher than a frame rate provided by the original image signal Sin, the frame processing unit 720 needs to increase the number of frames and the frame rate through motion frame compensation and frame interpolation, and then outputs the subtitle-captured frame signal Fb.

After receiving the 3D depth 3Dth and the subtitle-captured frame signal Fb outputted by the frame processing unit 720, the subtitle superimposing unit 730 superimposes the subtitle in the subtitle-captured frame signal Fb (e.g., the left-eye frame and the right-eye frame without the subtitle). The shift distance between the subtitle positions is regarded as the 3D depth 3Dth. The subtitle superimposing unit 730 then outputs a left-eye frame Lo and a right-eye frame Ro with the superimposed subtitle, such that a viewer can view the dynamic 3D subtitle when the display apparatus plays the left-eye frame Lo and the right-eye frame Ro with the superimposed subtitle. Moreover, the subtitle and the main object have the same 3D depth.

When a viewer wishes to change the display mode of the subtitle from a 3D display mode to a static mode, the subtitle capturing unit 710 receives the externally inputted original signal Sin and captures the subtitle Sub in the left-eye frame and the right-eye frame in the original image signal Sin. The subtitle capturing unit 710 then outputs the captured subtitle Sub to the subtitle superimposing unit 730 and the subtitle-captured frame signal Fa to the frame processing unit 720.

After the frame processing unit 720 receives the subtitle-captured frame signal Fa, a 3D depth processing unit 724 directly generates a fixed 3D depth and outputs the 3D depth to the subtitle superimposing unit 730.

After receiving the 3D depth 3Dth and the subtitle-captured frame signal Fb outputted by the frame processing unit 720, the subtitle superimposing unit 730 superimposes the subtitle in the subtitle-captured frame signal Fb. The shift distance between the subtitle positions remains unchanged, i.e., the 3D depth (3Dth) is a fixed value. The subtitle superimposing unit 730 then outputs the left-eye frame Lo and the right-eye frame Ro with the superimposed subtitle, such that a viewer can view the 2D subtitle when the display apparatus plays the left-eye frame Lo and the right-eye frame Ro with the superimposed subtitle.

In other words, in the subtitle control device in FIG. 8, a subtitle capturing unit obtains left-eye subtitle information from a left-eye frame and right-eye subtitle information from a right-eye frame, and determines an original subtitle display mode according to a shift distance of the left-eye subtitle information and the right-eye subtitle information. A frame processing unit generates a 3D depth. The subtitle superimposing unit then selectively generates an adjusted left-eye frame and an adjusted right-eye frame according to the 3D depth. An adjusted subtitle presented by the adjusted right-eye frame and the adjusted left-eye frame shows the adjusted subtitle 3D depth.

Figure 9A:
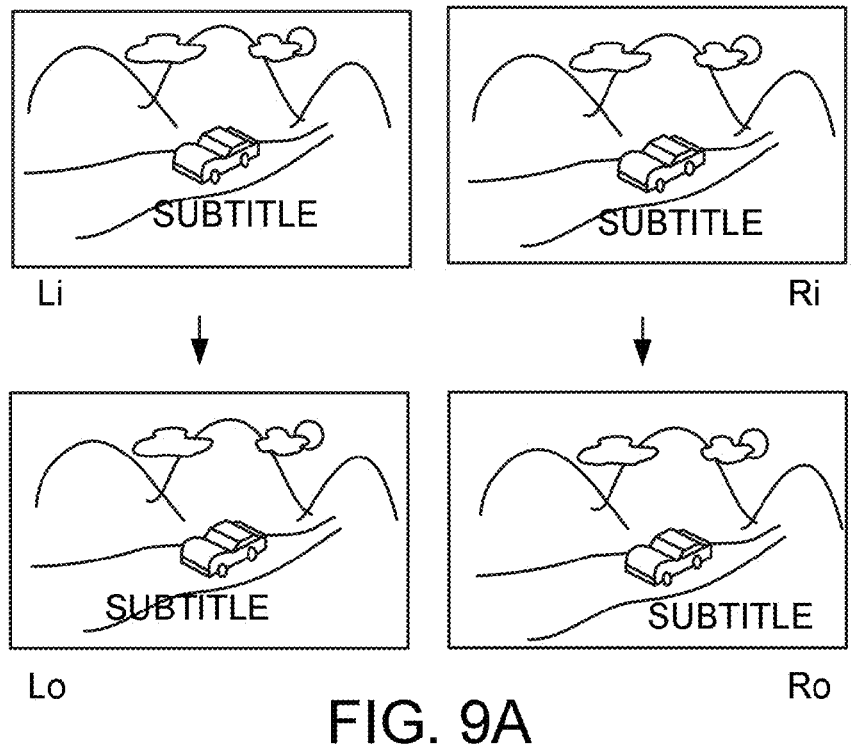
FIG. 9A is a schematic diagram of changing a display mode of a subtitle from a 2D display mode to a dynamic 3D display mode.

FIG. 9A shows a schematic diagram of changing the display mode of a subtitle from a 2D display mode to a dynamic 3D display mode. Assume that a left-eye frame Li and a right-eye frame Ri in an original image signal are presented in a 2D display mode, i.e., the 3D depth is a fixed value (e.g., equal to d1 or 0), and subtitle positions in the left-eye frame Li and the right-eye frame Ri stay unchanged. When converting the display mode to a 3D display mode, a shift distance between positions of the subtitle in the left-eye frame Lo and the right-eye frame Ro is resulted. Along with the change in the 3D depth, the shift distance between the subtitle positions in the left-eye frame Lo and the right-eye frame Ro is also changed to present a dynamic 3D subtitle.

Figure 9B:
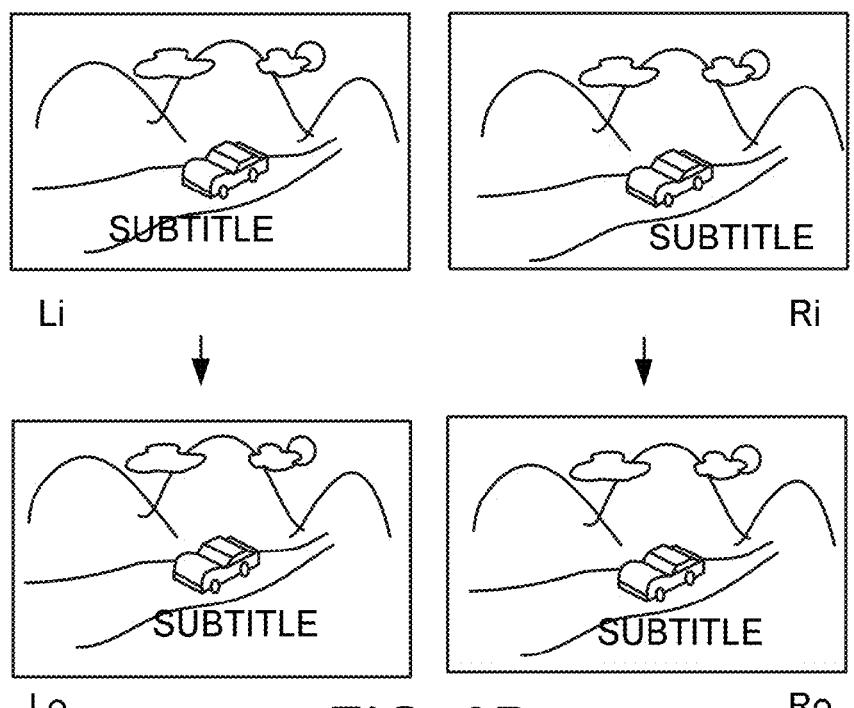
FIG. 9B is a schematic diagram of changing a display mode of a subtitle from a dynamic 3D display mode to a 2D display mode.

FIG. 9B shows a schematic diagram of changing a display mode of a subtitle from a dynamic 3D display mode to a static display mode. Assume that the left-eye frame Li and the right-eye frame Ri in the original image signal are presented in a dynamic 3D display mode, and the 3D depth is constantly changing. That is, a shift distance between the subtitle positions in the left-eye frame Li and the right-eye frame Ri also changes. When converting the display mode to a static display mode, the shift distance between the subtitle positions in the left-eye frame Lo and the right-eye frame Ro becomes a fixed value. Therefore, the shift distance between the subtitle position in the left-eye frame Lo and the right-eye frame Ro stays unchanged while having a 3D depth in a fixed value to present a static subtitle.

Figure 9C:
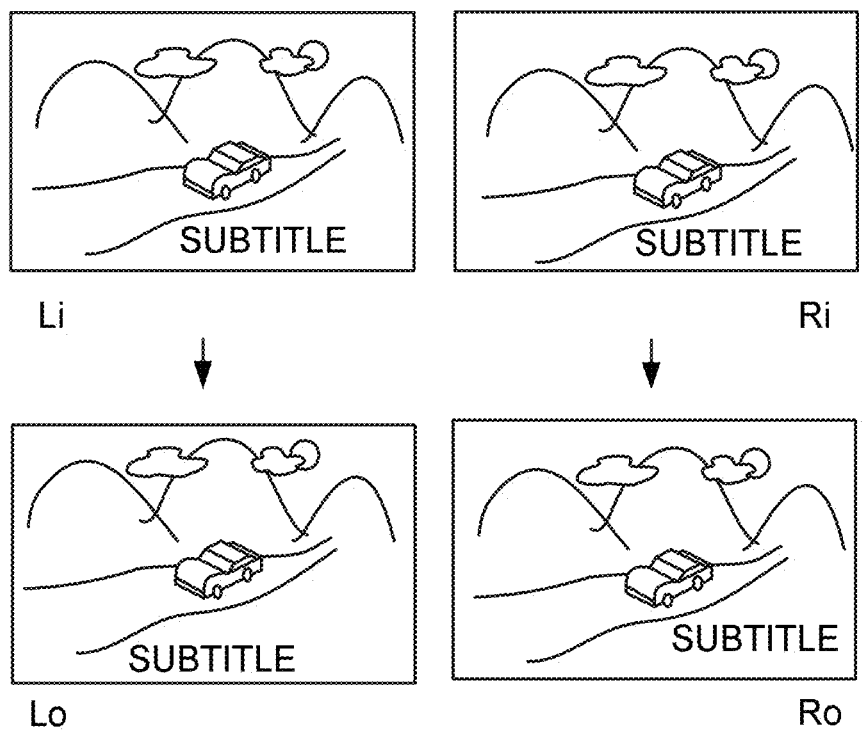
FIG. 9C is a schematic diagram of changing a display mode of a subtitle from a dynamic 3D display mode to a dynamic 3D display mode.

It should be noted that, the above subtitle control method may also change the 3D depth of the subtitle presented in a dynamic 3D display mode to reinforce a stereoscopic effect of the subtitle. FIG. 9C shows a schematic diagram of changing a display mode of a subtitle from a dynamic 3D display mode to a 3D dynamic 3D display mode. Assume that the left-eye frame Li and the right-eye frame Ri in the original image signal are presented in a dynamic 3D display mode, and the 3D depth is constantly changing. In the event that the viewer is unsatisfied with the level of the 3D subtitle display mode and wishes to view the subtitle with a more intense stereoscopic effect, the original 3D depth of the subtitle may be added by an offset or multiplied by a gain to increase the 3D depth of the subtitle. Thus, after increasing the value of the 3D depth, a greater shift distance between the subtitle positions in the left-eye frame Lo and the right-eye frame Ro is produced. Along with the change in the 3D depth, the shift distance between the subtitle in the left-eye frame Lo and the right-eye frame Ro also changes to render a subtitle having a more intense stereoscopic effect.

On the other hand, according to the above approach, the viewer may also subtract an offset from (or multiple by a gain smaller than 1) the 3D depth of the subtitle, so as to render a subtitle having a more moderate stereoscopic effect.

Therefore, a method and apparatus for controlling a subtitle applied to a display apparatus are provided as illustrated in the descriptions of the embodiments. When an original image signal from an image source is received, the display apparatus may capture a subtitle in a left-eye frame and a right-eye frame and change a 3D depth of the subtitle, such that a viewer may select a dynamic 3D display mode or a static display mode for presenting the subtitle.

To provide more 3D movies, display apparatuses for converting a 2D movie to a 3D movie are now available. That is, a single frame in the 2D movie is processed by a predetermined algorithm to obtain a 3D movie having a left-eye frame and a right-eye frame. The subtitle display method of the present invention can also be applied to the above display apparatuses.

For example, during the processing of converting a 2D movie to a 3D movie, a subtitle in the 2D movie may first be captured. The method for determining the display mode for the subtitle is then selectively performed after obtaining the left-eye frame and the right-eye frame. For example, the 3D depth of the subtitle is fixed to present the subtitle in a static display mode, or the 3D depth is dynamically changed to present the subtitle in a dynamic 3D display mode.

More specifically, in the process of converting a 2D image having a single frame into a 3D image having a right-eye frame and a left-eye frame, the subtitle of the single frame is first captured. The subtitle is selectively superimposed in the right-eye frame and the left-eye frame, so that an adjusted subtitle in the right-eye frame and the left-eye frame shows an adjusted subtitle 3D depth. A display mode of the adjusted subtitle includes a static display mode and a dynamic 3D display mode.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A subtitle control method, applicable to a display apparatus, for dynamically adjusting a subtitle of an original image, the original image comprising a right-eye frame and a left-eye frame, the right-eye frame comprising right-eye subtitle information, the left-eye frame comprising left-eye subtitle information, the method comprising:
 selecting an adjusted subtitle display mode;
 determining a shift distance of the right-eye subtitle information and the left-eye subtitle information;
 selectively adjusting the shift distance according to the adjusted subtitle display mode and a selected 3D depth, such that an adjusted subtitle presented by the right-eye frame and the left-eye frame shows an adjusted subtitle 3D depth; and
 determining an original subtitle display mode, comprising:
  comparing the shift distance of the right-eye subtitle information and the left-eye subtitle information;
  determining the original subtitle display mode as a static display mode when the shift distance is substantially stable; and
 determining the original subtitle display mode as a dynamic 3D display mode when the shift distance changes with time;
 wherein, the adjusted subtitle display mode comprises a static display mode and a dynamic 3D display mode, and when the adjusted subtitle display mode is different from the original subtitle display mode, the selected 3D depth is generated according to the adjusted subtitle display mode to accordingly adjust the shift distance.

2. The method according to claim 1, wherein when the adjusted subtitle display mode is the dynamic 3D display mode, and the selected 3D depth is associated with a 3D depth of an object in the original image.

3. The method according to claim 1, wherein when the adjusted subtitle display mode is different from the original subtitle display mode, the selected 3D depth is provided by a user to accordingly adjust the shift distance.

4. A subtitle control device, applicable to a display apparatus, configured to dynamically adjust a subtitle of an original image, the original image comprising a right-eye frame and a left-eye frame, the right-eye frame comprising right-eye subtitle information, the left-eye frame comprising left-eye subtitle information, the device comprising:
 a subtitle capturing unit, configured to capture the left-eye subtitle information from the left-eye frame and the right-eye subtitle information from the right-eye frame, and determining an original subtitle display mode according to a shift distance of the right-eye subtitle information and the left-eye subtitle information;
 a frame processing unit, configured to generate a 3D depth; and
 a subtitle superimposing unit, configured to selectively generate an adjusted left-eye frame and an adjusted right-eye frame according to the 3D depth;
 wherein, an adjusted subtitle presented by the adjusted right-eye frame and the adjusted left-eye frame shows an adjusted subtitle 3D depth;
 wherein when it is determined to change the original subtitle display mode, the subtitle superimposing unit adjusts the shift distance according to the 3D depth; and
 wherein when the adjusted subtitle display mode is the dynamic 3D display mode, the frame processing unit generates the 3D depth according to a 3D depth of an object in the original image.

5. The device according to claim 4, wherein the subtitle capturing unit determines the original subtitle display mode as a static display mode when the shift distance is substantially stable, and determines the original subtitle display mode as a dynamic 3D display mode when the shift distance changes with time.

6. The device according to claim 4, wherein when it is determined to change the original subtitle display mode, the 3D depth is provided by a user for the subtitle superimposing unit to accordingly adjust the shift distance.

* * * * *